(12) United States Patent
Shimomura et al.

(10) Patent No.: US 7,570,433 B2
(45) Date of Patent: Aug. 4, 2009

(54) PHOTOELECTRIC ENCODER

(75) Inventors: Toshitaka Shimomura, Utsunomiya (JP); Shingo Nihommori, Himeji (JP); Miyako Mizutani, Kawasaki (JP); Eric Herbert Altendorf, Everett, WA (US); Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 10/599,105

(22) PCT Filed: Mar. 18, 2005

(86) PCT No.: PCT/JP2005/004924

§ 371 (c)(1), (2), (4) Date: Sep. 19, 2006

(87) PCT Pub. No.: WO2005/090923

PCT Pub. Date: Sep. 29, 2005

(65) Prior Publication Data

US 2007/0215797 A1    Sep. 20, 2007

Related U.S. Application Data

(63) Continuation-in-part of application No. 10/804,636, filed on Mar. 19, 2004, now Pat. No. 7,186,969, which is a continuation-in-part of application No. 10/776,899, filed on Feb. 11, 2004, now abandoned.

(51) Int. Cl.
*G02B 13/22* (2006.01)

(52) U.S. Cl. ................................ 359/663; 250/216
(58) Field of Classification Search ................ 359/663; 250/215, 216, 229, 231.13, 231.14
See application file for complete search history.

(56) References Cited

U.S. PATENT DOCUMENTS

| 3,454,777 A | 7/1969 | Marcus |
| 4,051,367 A | 9/1977 | Sayce et al. |
| 4,799,798 A | 1/1989 | Erb |
| 4,948,968 A | 8/1990 | Matsui |
| 4,974,962 A | 12/1990 | Stephens et al. |

(Continued)

FOREIGN PATENT DOCUMENTS

DE       1 523 231       5/1969

(Continued)

OTHER PUBLICATIONS

Berger, C., "Design of Telecentric Imaging Systems for Noncontact Velocity Sensors," *Optical Engineering* 4(10):2599-2606, Oct. 2002.

(Continued)

*Primary Examiner*—Darryl J Collins
(74) *Attorney, Agent, or Firm*—Christensen O'Connor Johnson Kindness PLLC

(57) ABSTRACT

A photoelectric encoder has a telecentric optical system in which a first lens and an aperture located at a focal position of the first lens are interposed between a main scale and a photoreceptor. At least a second lens is interposed between the aperture and the photoreceptor with a focus of the second lens on the aperture, thereby constituting a bilateral telecentric optical system. This makes it possible to improve the signal detection efficiency and increase the assembly tolerance.

8 Claims, 9 Drawing Sheets

U.S. PATENT DOCUMENTS

| | | | |
|---|---|---|---|
| 5,075,562 A | 12/1991 | Greivenkamp, Jr. et al. | |
| 5,539,519 A | 7/1996 | Takagi et al. | |
| 5,576,537 A | 11/1996 | Holzapfel | |
| 5,583,632 A | 12/1996 | Haga | |
| 5,751,492 A | 5/1998 | Meyers | |
| 5,900,983 A * | 5/1999 | Ford et al. | 359/627 |
| 6,393,191 B1 | 5/2002 | Chen | |
| 6,617,572 B2 | 9/2003 | Ishizuka | |
| 6,635,863 B1 | 10/2003 | Nihommori et al. | |
| 6,856,466 B2 * | 2/2005 | Tocci | 359/663 |
| 7,038,776 B1 * | 5/2006 | Ansley et al. | 356/364 |
| 2003/0209658 A1 | 11/2003 | Iguchi et al. | |
| 2004/0173737 A1 | 9/2004 | Shimomura et al. | |
| 2006/0202112 A1 * | 9/2006 | Mizutani | 250/231.13 |
| 2007/0018084 A1 * | 1/2007 | Shimomura et al. | 250/231.13 |

FOREIGN PATENT DOCUMENTS

| | | |
|---|---|---|
| DE | 10226444 A1 | 1/2004 |
| EP | 0926853 A2 | 6/1999 |
| JP | 59-134006 | 9/1984 |
| JP | B-60-23282 B2 | 6/1985 |
| JP | 62-200223 A | 9/1987 |
| JP | 63250522 | 10/1988 |
| JP | A-1-57120 A | 3/1989 |
| JP | B-2610624 B2 | 2/1997 |
| JP | 2002-231604 A | 8/2002 |
| JP | 2003-021787 A | 1/2003 |
| JP | 2003-307440 A | 10/2003 |

OTHER PUBLICATIONS

Chinese Office Action (English Translation) issued in Chinese Patent Application No. 2004-10045139.4, 4 pages.

Supplementary European Search Report dated Jan. 14, 2008, issued in corresponding Application No. EP 05721111.

* cited by examiner

Image formed by light past left aperture

+ Image formed by light past center aperture

+ Image formed by light past right aperture

Superposition

Wider FOV

PHOTOELECTRIC ENCODER

TECHNICAL FIELD

The present invention relates to a photoelectric encoder, and more particularly to an improvement of a photoelectric encoder that has a telecentric optical system in which a lens and an aperture are interposed between a main scale and photoreceptors.

BACKGROUND ART

As described in Japanese Patent Laid-Open Publication No. 2004-264295, a photoelectric encoder has been devised in which, as shown in FIG. 1, a lens optical system (a telecentric optical system) 40 consisting of a lens 42 and an aperture 44 (a telecentric optical aperture) is interposed between a main scale 20 and a photoreception unit 30 made of, e.g., a photoreceptor array 34. As shown in FIG. 2, the distances a and b from the lens 42 to a scale 21 of the main scale 20 and to photoreceptors 35 on the photoreceptor array 34 can thus be adjusted for magnification setting. In FIG. 1, 10 denotes a light source, and f denotes the focal length of the lens 42.

In the photoelectric encoder using this telecentric optical system 40, an image on the main scale 20 is projected onto the photoreceptor array 34 via the lens optical system (42, 44). Here, since the aperture 44 is located in the focal position of the lens 42, the image formed on the photoreceptor array 34 can be prevented from varying in magnification even if the distance (gap) between the main scale 20 and the lens 42 changes as long as the physical relationship among the lens 42, the aperture 44, and the photoreceptor array 34 is unchanged.

Nevertheless, even with the photoelectric encoder using such a telecentric optical system 40, misalignment of the photoreceptors 35 in the gap direction can change the relationship between the distance a from the lens 42 to the main scale 20 and the distance b from the lens 42 to the photoreceptors 35 as shown in FIG. 3. This changes the magnification of the image formed on the photoreception plane 31 significantly with a sharp drop in signal intensity as shown in FIG. 4.

Besides, the signal detection efficiency in the peripheral area also drops due to lens distortion and coma aberration.

Moreover, when miniaturization is intended, the optical system requires a lens that has a shorter focal length (a smaller diameter, in the case of a general-purpose lens). To maintain the aberrations smaller, however, it is necessary (1) to use an aspherical lens or (2) to use a plurality of lenses in combination (with adjustment). There have thus been such problems as a rise in cost and additional man-hours for adjustment.

DISCLOSURE OF THE INVENTION

The present invention has been achieved in view of the foregoing conventional problems, and it is thus an object thereof to improve the signal detection efficiency, increase assembly tolerance, and reduce the man-hours for adjustment.

The foregoing object of the present invention has been achieved by the provision of a transmission type photoelectric encoder having a telecentric optical system in which a first lens and an aperture located at a focal position of the first lens are interposed between a main scale and a photoreceptor, and wherein at least a second lens is interposed between the aperture and the photoreceptor with a focus of the second lens on the aperture, thereby constituting a bilateral telecentric optical system.

Moreover, the second lens is made identical to the first lens and is situated reversely. The second lens can thus inversely correct an aberration occurring from the first lens so that the aberration is cancelled out almost completely.

The foregoing object of the present invention has also been achieved by the provision of a photoelectric encoder having a telecentric optical system in which a first lens and an aperture located at a focal position of the first lens are interposed between a main scale and a photoreceptor, and wherein one or more second bilateral telecentric optical systems including a second aperture and third and fourth lenses arranged on both sides thereof is/are further interposed between the second lens and the photoreceptor.

The foregoing object of the present invention has also been achieved by the provision of a photoelectric encoder having a telecentric optical system in which two lenses and an aperture located at a focal position of the two lenses are interposed between a main scale and a photoreceptor, and wherein the two lenses comprise identical lenses having a symmetrical front and back shape with regard to a central plane perpendicular to an optical axis.

Moreover, each of the two lenses is made of a spherical ball lens, which has high distortion but is inexpensive; a GRIN lens of gradient refractive index type (also called SELFOC lens), which refracts light beams in a parabolic pattern inside its lens medium; or a drum lens. This allows compact configuration at a low price.

Moreover, the aperture is formed as a slit oblong in a direction perpendicular to an axis of measurement, so that the amount of light to reach the photoreceptor is increased for the sake of power saving and improved reliability of the light source.

According to the present invention, the second lens can inversely correct the aberration occurring from the first lens. This makes it possible to reduce the aberration and improve the signal detection efficiency.

Moreover, even if the gap between the second lens and the photoreceptors varies, the optical magnification can be maintained constant. This can increase the assembly tolerance in the gap direction and reduce the man-hours for adjustment.

BEST MODE FOR CARRYING OUT THE INVENTION

Hereinafter, embodiments of the present invention will be described in detail with reference to the drawings.

Figure 1:
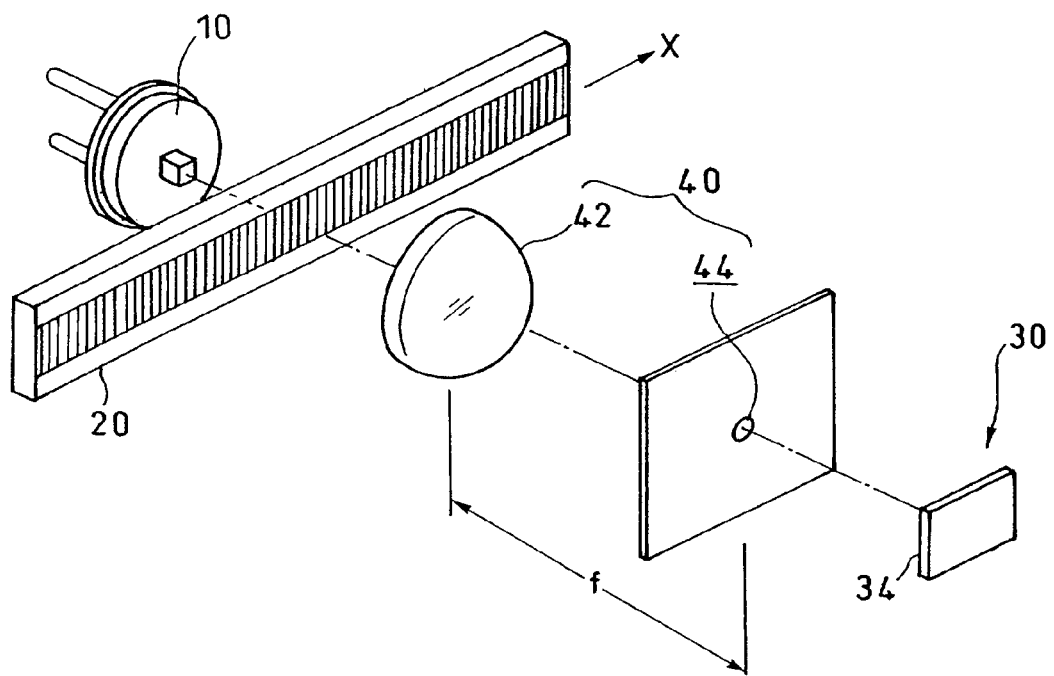
FIG. 1 is a perspective view showing the configuration of essential parts of a photoelectric encoder having a telecentric optical system.
Figure 2:
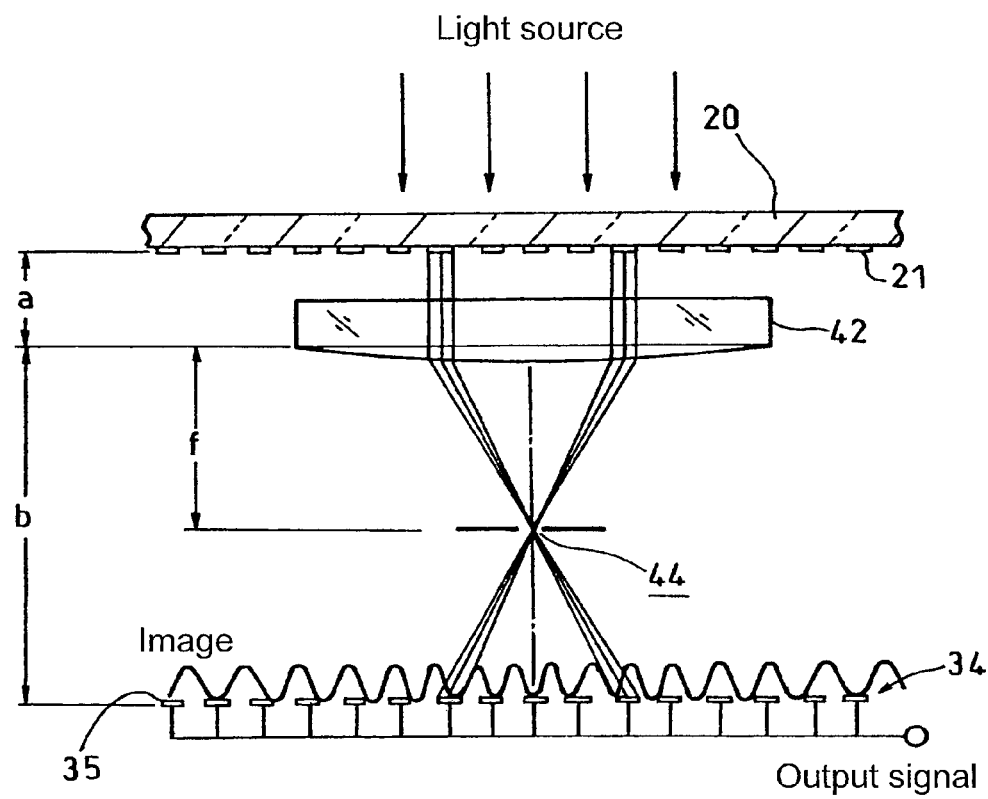
FIG. 2 is a plan view of the same.
Figure 3:
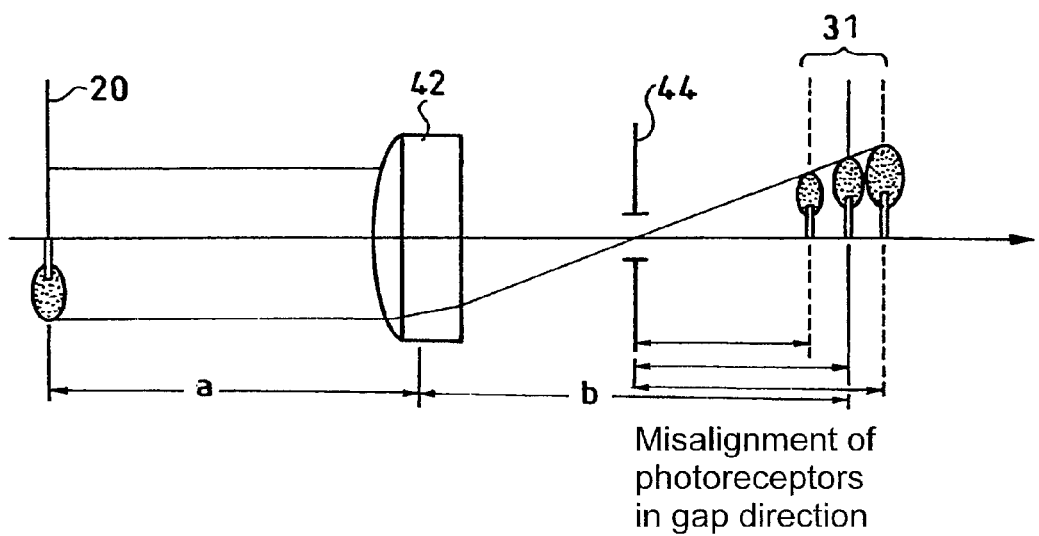
FIG. 3 is a ray diagram for explaining variations in magnitude ascribable to misalignment of the photoreceptors of the same in the gap direction.
Figure 4:
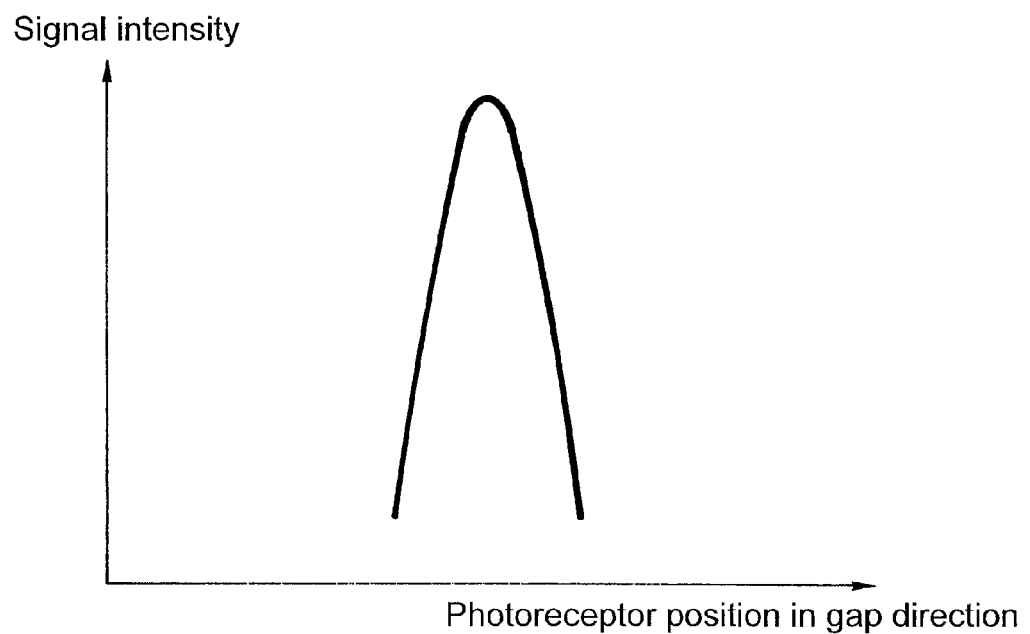
FIG. 4 is a chart showing an example of variation of the signal intensity of the same.
Figure 5:
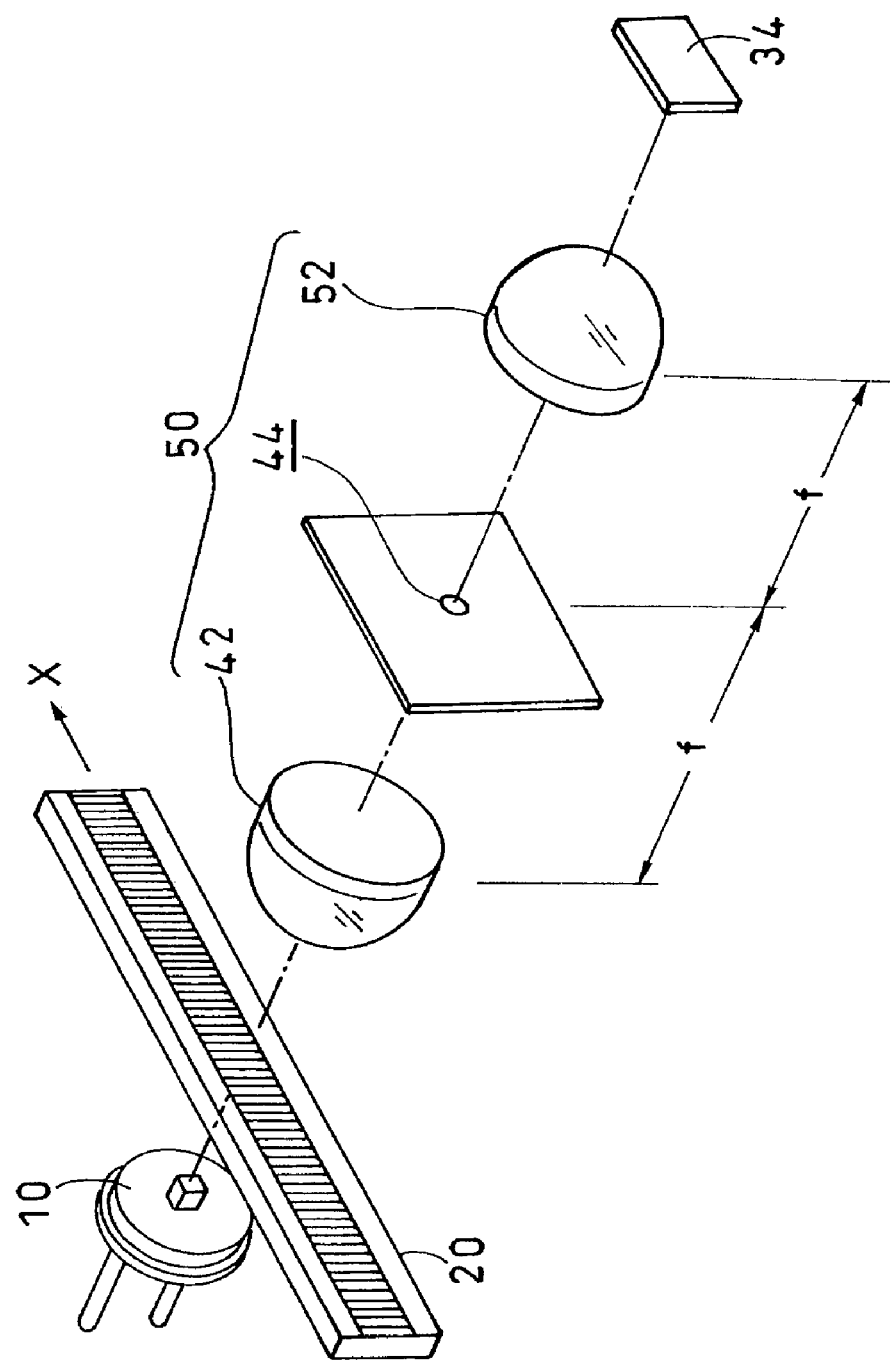
FIG. 5 is a perspective view showing the configuration of essential parts of a first embodiment of the present invention.

A first embodiment of the present invention is a photoelectric encoder having a telecentric optical system 40 like shown in FIG. 1. As shown in FIG. 5, a lens 52 identical to the first lens 42 is interposed on the other side of the aperture 44 in a reverse orientation with its focus on the aperture 44, thereby constituting a bilateral telecentric optical system 50. In the diagram, f represents the focal lengths of the lenses 42 and 52.

In the present embodiment, the first lens 42 and the second lens 52 are identical. The second lens 52 can thus inversely correct aberrations occurring from the first lens 42 almost completely. It is therefore possible to cancel out the aberrations almost completely with a significant improvement in the signal detection efficiency.

Figure 6:
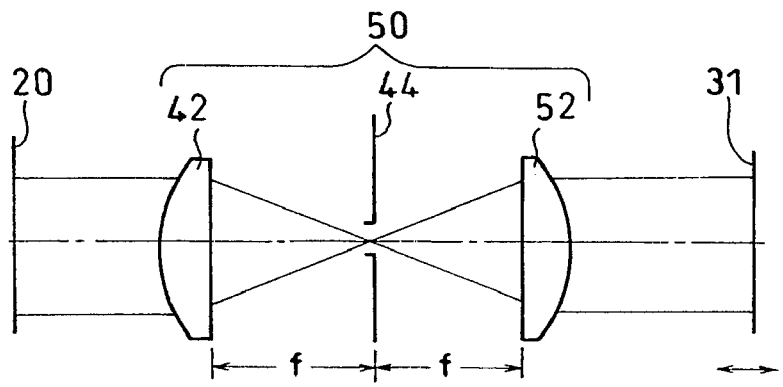
FIG. 6 is a ray diagram of the same.

Moreover, since the second lens 52 is interposed so that its focus falls on the aperture 44, the outgoing light from the second lens 52 becomes parallel light as shown in FIG. 6, and the optical magnification is maintained constant (1×) even when the gap between the second lens 52 and the photoreception plane 31 varies. This makes it possible to increase the assembly tolerance in the gap direction and reduce the man-hours for adjustment.

Figure 7:
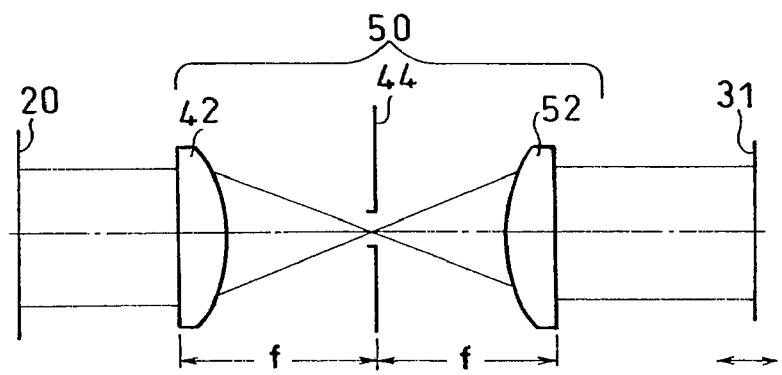
FIG. 7 is a ray diagram showing the configuration of essential parts of a second embodiment of the present invention.
Figure 8:
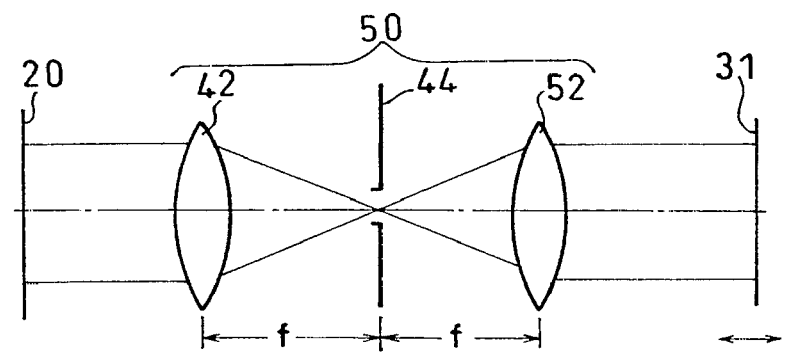
FIG. 8 is a ray diagram showing the configuration of essential parts of a third embodiment of the present invention.
Figure 9:
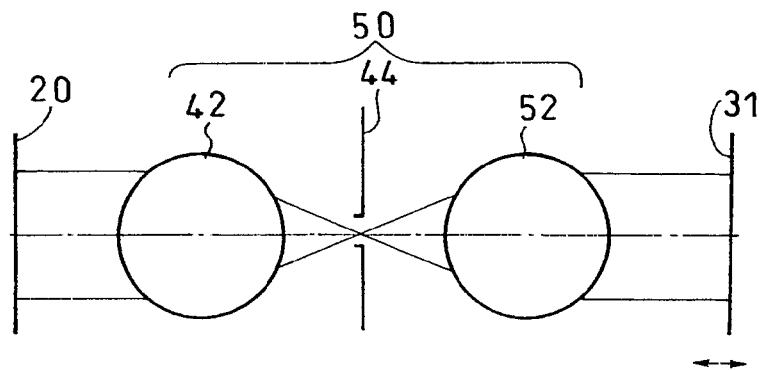
FIG. 9 is a ray diagram showing the configuration of essential parts of a fourth embodiment of the present invention.
Figure 10:
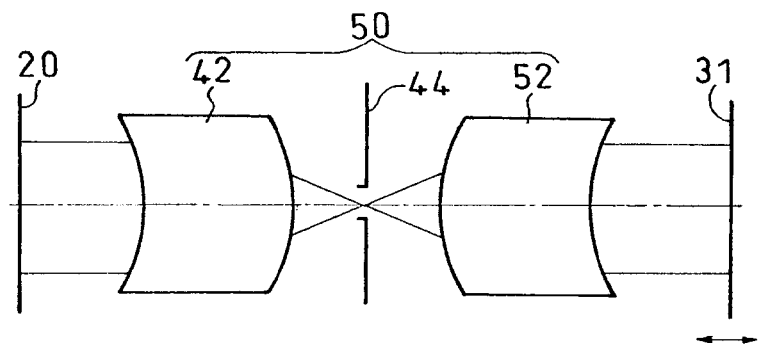
FIG. 10 is a ray diagram showing the configuration of essential parts of a fifth embodiment of the present invention.
Figure 11:
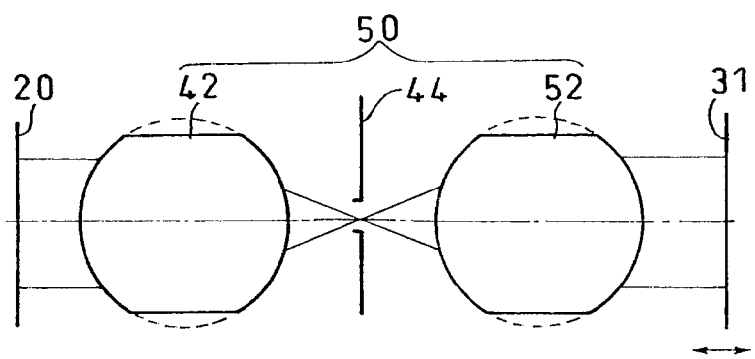
FIG. 11 is a ray diagram showing the configuration of essential parts of a sixth embodiment of the present invention.

It should be appreciated that the first and second lenses 42 and 52 need not necessarily be plano-convex lenses which are used outward as shown in FIG. 6, but plano-concave lenses may be used inward as in a second embodiment shown in FIG. 7. Otherwise, biconvex lenses may be used as in a third embodiment shown in FIG. 8. Otherwise, ball lenses may be used for miniaturization and cost reduction as in a fourth embodiment shown in FIG. 9. Otherwise, GRIN lenses may be used for miniaturization and cost reduction as in a fifth embodiment shown in FIG. 10. Otherwise, drum lenses may be used for miniaturization and cost reduction as in a sixth embodiment shown in FIG. 11.

Figure 12:
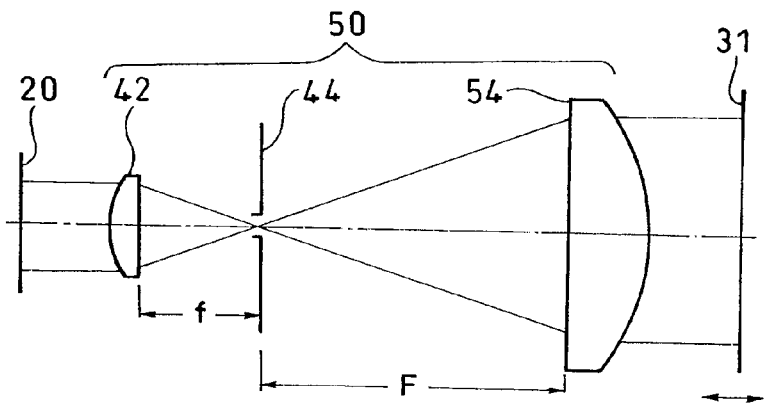
FIG. 12 is a ray diagram showing the configuration of essential parts of a seventh embodiment of the present invention.

Moreover, as in a seventh embodiment shown in FIG. 12, the second lens 54 may be made different from the first lens 42 so as to change the optical magnification between the IN side and the OUT side to other than 1×. In the diagram, F represents the focal length of the second lens 54.

In this case, it might be impossible to eliminate aberrations completely, whereas the assembly tolerance in the gap direction increases.

Figure 13:
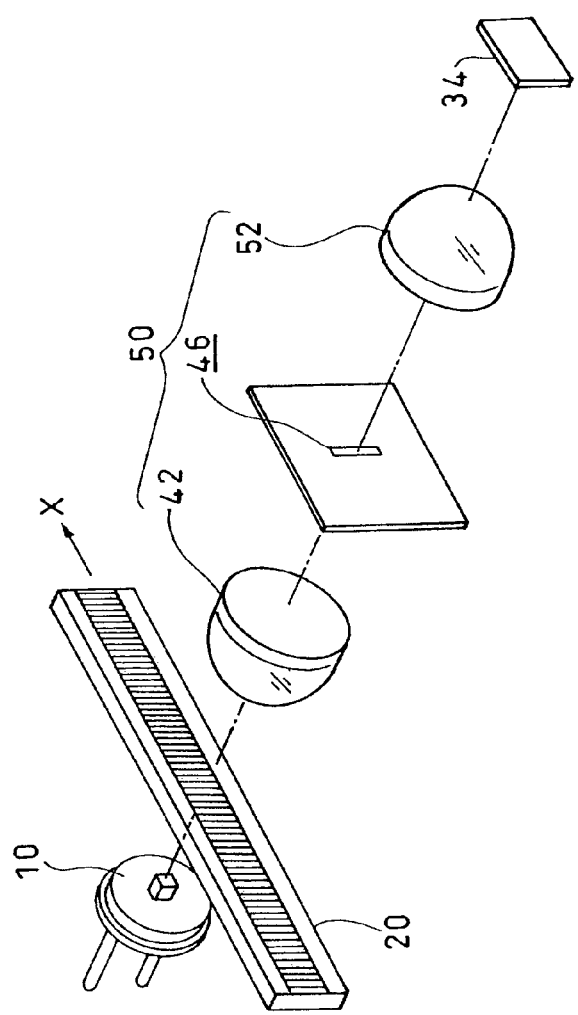
FIG. 13 is a perspective view showing the configuration of essential parts of an eighth embodiment of the present invention.

Moreover, the aperture may have a non-circular shape. As in an eighth embodiment shown in FIG. 13, a slit 46 oblong in the direction perpendicular to the axis of measurement may be formed so that the amount of light to reach the photoreception plane 31 is increased for the sake of power saving and improved reliability of the light source 10. Alternatively, the aperture may have an elliptic or oval shape.

Figure 14:
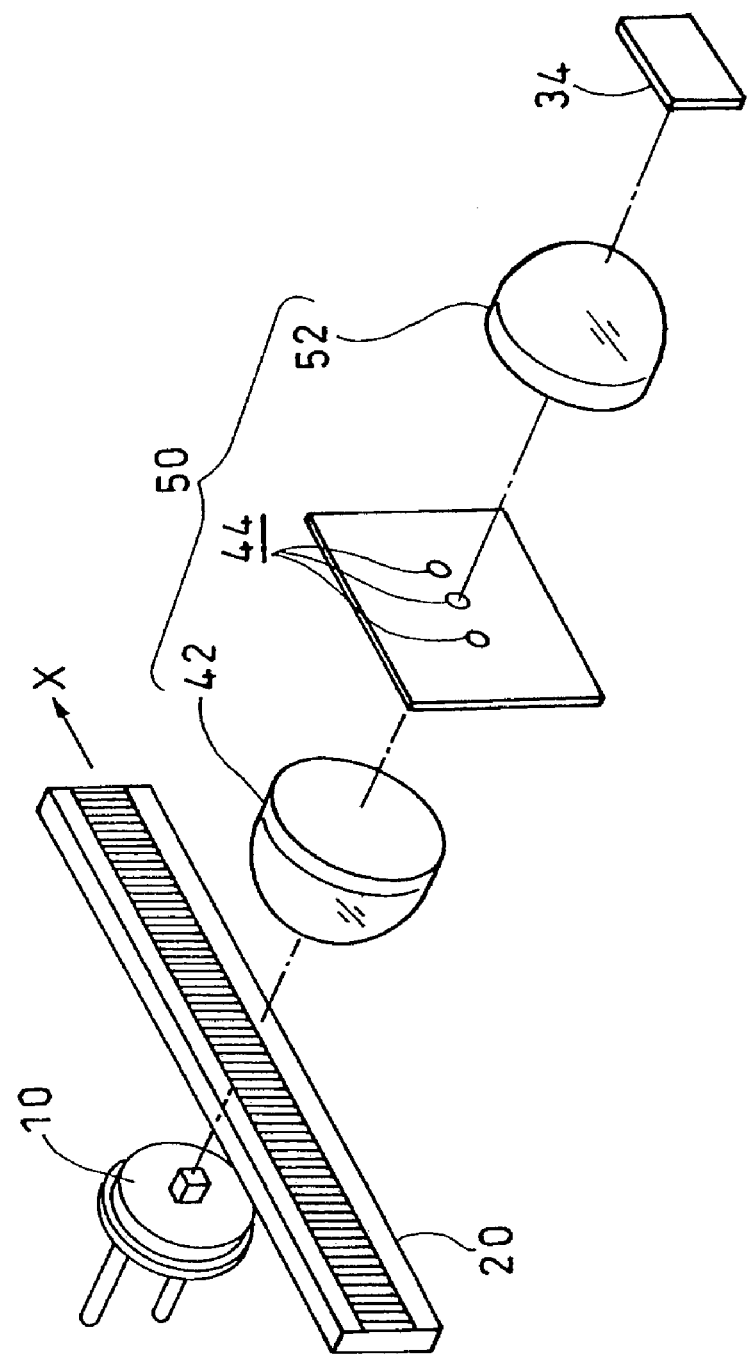
FIG. 14 is a ray diagram showing the configuration of essential parts of a ninth embodiment of the present invention.
Figure 15:
FIG. 15 is a diagram showing the effect of the same.
Figure 15:
Figure 15:
Figure 15:
Figure 15:
Figure 15:

Furthermore, as in a ninth embodiment shown in FIG. 14, the number of apertures of the bilateral telecentric system 50 may be increased along the axis of measurement. This widens the on-scale field of view (FOB) by image superposition, provides robustness against stains and wobbles by the averaging effect, and increases the amount of light to reach the photoreception plane 31, thereby allowing power saving and improved reliability of the light source 10.

Figure 16:
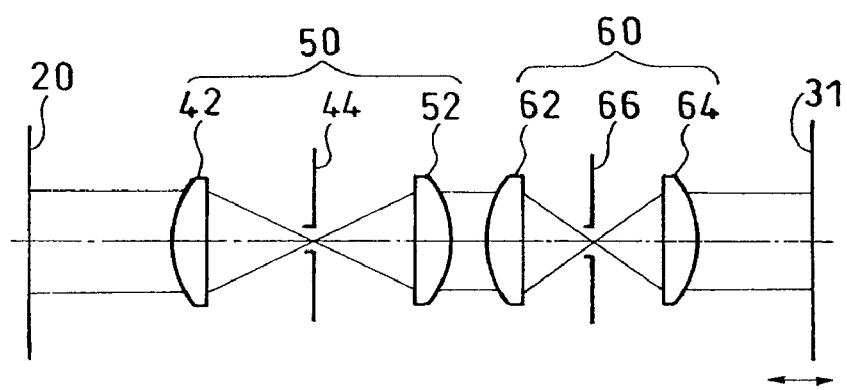
FIG. 16 is a ray diagram showing the configuration of essential parts of a tenth embodiment of the present invention.

Moreover, the number of lenses to be added is not limited to one. As in a tenth embodiment shown in FIG. 16, another bilateral telecentric system 60 consisting of lenses 62 and 64 and an aperture 66 may be added. Here, the lenses 62 and 64 may be the same as or different from the lenses 42 and 52. The number of bilateral telecentric systems to be added is not limited to one, either. Two or more systems may be added.

INDUSTRIAL APPLICABILITY

The present invention is applicable to either of an encoder in which the index grating and the photoreceptors are formed separately and an encoder having a photoreceptor array having the two components formed integrally. Moreover, it is applicable not only to encoders of transmission type, but to encoders of reflection type as well.

The invention claimed is:

1. A photoelectric encoder having a telecentric optical system in which a first lens and an aperture located at a focal position of the first lens are interposed between a main scale and a photoreceptor, wherein at least a second lens is interposed between the aperture and the photoreceptor with a focus of the second lens on the aperture, thereby constituting a bilateral telecentric optical system, and wherein one or more second bilateral telecentric optical systems including a second aperture and third and fourth lenses arranged on both sides thereof is/are further interposed between the second lens and the photoreceptor.

2. The photoelectric encoder according to claim 1, wherein at least one of the first aperture and the second aperture is formed as a slit oblong in a direction perpendicular to an axis of measurement.

3. A photoelectric encoder having a telecentric optical system in which two lenses and an aperture located at a focal position of the two lenses are interposed between a main scale and a photoreceptor, wherein the two lenses comprise identical lenses having a symmetrical front and back shape with regard to a central plane perpendicular to an optical axis, and wherein each of the two lenses is made of a ball lens.

4. The photoelectric encoder according to claim 3, wherein the aperture is formed as a slit oblong in a direction perpendicular to an axis of measurement.

5. A photoelectric encoder having a telecentric optical system in which two lenses and an aperture located at a focal position of the two lenses are interposed between a main scale and a photoreceptor, wherein the two lenses comprise identical lenses having a symmetrical front and back shape with regard to a central plane perpendicular to an optical axis, and wherein each of the two lenses is made of a GRIN lens.

6. The photoelectric encoder according to claim 5, wherein the aperture is formed as a slit oblong in a direction perpendicular to an axis of measurement.

7. A photoelectric encoder having a telecentric optical system in which two lenses and an aperture located at a focal position of the two lenses are interposed between a main scale and a photoreceptor, wherein the two lenses comprise identical lenses having a symmetrical front and back shape with regard to a central plane perpendicular to an optical axis, and wherein each of the two lenses is made of a drum lens.

8. The photoelectric encoder according to claim 7, wherein the aperture is formed as a slit oblong in a direction perpendicular to an axis of measurement.

* * * * *